US012764689B2

(12) United States Patent
Won et al.

(10) Patent No.: US 12,764,689 B2
(45) Date of Patent: Oct. 13, 2026

(54) METHOD, APPARATUS AND COMPUTER PROGRAM

(71) Applicant: Nokia Technologies Oy, Espoo (FI)

(72) Inventors: Sung Hwan Won, Dallas, TX (US); Muhammad Naseer-Ul-Islam, Munich (DE); Philippe Godin, Massy (FR); Alessio Casati, West Molesey (GB); Rajesh Babu Natarajan, Bangalore (IN); Srinivas Bandi, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 344 days.

(21) Appl. No.: 18/414,935

(22) Filed: Jan. 17, 2024

(65) Prior Publication Data

US 2024/0244558 A1 Jul. 18, 2024

(30) Foreign Application Priority Data

Jan. 17, 2023 (GB) ..................................... 2300663

(51) Int. Cl.
*H04W 60/00* (2009.01)

(52) U.S. Cl.
CPC .................................. *H04W 60/00* (2013.01)

(58) Field of Classification Search
CPC ..... H04W 48/18; H04W 48/16; H04W 48/20; H04W 48/12; H04W 60/00; H04W 76/10; H04W 36/08; H04W 76/12; H04W 28/16; H04W 36/14; H04W 24/02; H04W 36/0061; H04W 74/0833; H04W 28/24; H04W 76/11; H04W 76/27; H04W 36/1443; H04W 48/00; H04W 76/20; H04W 60/002; H04W 92/02; H04W 72/1263; H04W 28/0226; H04W 84/04; H04L 41/0893
See application file for complete search history.

(56) References Cited

U.S. PATENT DOCUMENTS

2019/0037409 A1* 1/2019 Wang ...................... H04W 8/08
2019/0223093 A1* 7/2019 Watfa .................... H04W 36/13
2023/0239779 A1* 7/2023 Speicher ............... H04W 60/04
370/329

(Continued)

FOREIGN PATENT DOCUMENTS

WO 2019/245921 A1 12/2019
WO 2022/259830 A1 12/2022

OTHER PUBLICATIONS

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

(Continued)

*Primary Examiner* — Kwasi Karikari
(74) *Attorney, Agent, or Firm* — Lippes Mathias LLP

(57) ABSTRACT

There is provided an apparatus that has means for retrieving information associated with network slice selection, and means for selecting a network slice simultaneous registration group using the information associated with network slice selection. The apparatus also has means for providing, to a network entity, a requested network slice selection assistance information based on the selected network slice simultaneous registration group.

17 Claims, 12 Drawing Sheets

(56) References Cited

U.S. PATENT DOCUMENTS

2023/0262591 A1* 8/2023 Ishii ...................... H04W 48/20 370/331
2024/0397392 A1* 11/2024 Ishii ...................... H04W 36/08

OTHER PUBLICATIONS

"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"3rd Generation Partnership Project; Technical Specification Group Core Network and Terminals; Non-Access-Stratum (NAS) protocol for 5G System (5GS); Stage 3; (Release 17)", 3GPP TS 24.501, V17.7.1, Jun. 2022, pp. 1-991.
"3rd Generation Partnership Project; Technical Specification Group Core Network and Terminals; User Equipment (UE policies for 5G System (5GS); Stage 3 (Release 17)", 3GPP TS 24.526, V17.7.0, Jun. 2022, pp. 1-55.
"NSAG information IE", 3GPP TSG-CT WG1 Meeting #137-e, C1-22xxxx, Nokia, Aug. 18-26, 2022, 11 pages.
Search Report received for corresponding United Kingdom Patent Application No. 2300663.8, dated Jul. 3, 2023, 2 pages.
"Network slice AS group—General aspects", 3GPP TSG-CT WG1 Meeting #135-e, C1-223529, Nokia, Apr. 6-12, 2022, 13 pages.
"New SID: Study on Improvements of network controlled Network Slice Selection", TSG SA Meeting #102, SP-231674, Agenda: 6.4.2, SA WG2, Dec. 11-15, 2023, 4 pages.
Extended European Search Report received for corresponding European Patent Application No. 24152290.3, dated Jun. 3, 2024, 11 pages.
"Discussion on S-NSSAI selection with NSSRG information", 3GPP TSG-CT WG1 Meeting #135-e, C1-222953, Agenda: 17.2.14, Samsung, Apr. 6-12, 2022, 2 pages.
"3rd Generation Partnership Project; Technical Specification Group Services and System Aspects; System architecture for the 5G System (5GS); Stage 2 (Release 17)", 3GPP TS 23.501, V17.7.0, Dec. 2022, pp. 1-573.

* cited by examiner

METHOD, APPARATUS AND COMPUTER PROGRAM

CROSS REFERENCE TO RELATED APPLICATIONS

This application claims the benefit of priority of United Kingdom Patent Application No. 2300663.8 filed Jan. 17, 2023, which is hereby incorporated by reference as if reproduced in its entirety.

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprising: means for retrieving information associated with network slice selection; means for selecting a network slice simultaneous registration group using the information associated with network slice selection; and means for providing, to a network entity, a requested network slice selection assistance information based on the selected network slice simultaneous registration group.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the means for selecting comprises: means for determining an average priority value of the single-network slice selection assistance information in each network slice simultaneous registration group, that has been normalized using the number of single-network slice selection assistance information in each network slice simultaneous registration group; and selecting the network slice simultaneous registration group with the highest average priority value.

In an example, the means for selecting a network slice simultaneous registration group using the information associated with network slice selection comprises: means for selecting the network slice simultaneous registration group using: i) the information associated with network slice selection, and ii) single-network slice selection assistance information associated with an application used in a user equipment.

In an example, the means for selecting a network slice simultaneous registration group using the information associated with network slice selection comprises: means for selecting the network slice simultaneous registration group using: i) the information associated with network slice selection, and ii) single-network slice selection assistance information associated with an existing protocol data unit session of a user equipment.

In an example, the means for retrieving information associated with network slice selection comprises: means for receiving, via a user input, the information associated with network slice selection.

In an example, the means for retrieving comprises at least one of: means for receiving from a network function, and means for retrieving an accessible configuration.

In an example, the means for providing comprises: means for determining at least one single-network slice selection assistance information associated with the selected network slice simultaneous registration group; and means for providing, to a network entity, a requested network slice selection assistance information comprising the determined at least one single-network slice selection assistance information.

In an example, the information associated with network slice selection is received in one of: a registration accept message, a configuration update command message, and a manage user equipment policy command message.

In an example, one of: the apparatus is for the user equipment, the apparatus is comprised in the user equipment, the apparatus is the user equipment.

According to an aspect, there is provided an apparatus comprising: means for providing, to a user equipment, information associated with network slice selection, for the selection of a network slice simultaneous registration group at the user equipment; and means for receiving, from the user equipment, a requested network slice selection assistance information based on a first network slice simultaneous registration group selected by the user equipment.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the apparatus comprises: means for providing, to the user equipment, single-network slice selection assistance information associated with an application used in a user equipment.

In an example, the apparatus comprises: means for providing, to the user equipment, single-network slice selection assistance information associated with an existing protocol data unit session of a user equipment.

In an example, one of: the apparatus is for a network entity, the apparatus is comprised in the network entity, the apparatus is the network entity.

According to an aspect, there is provided a method comprising: retrieving information associated with network slice selection; selecting a network slice simultaneous registration group using the information associated with network slice selection; and providing, to a network entity, a requested network slice selection assistance information based on the selected network slice simultaneous registration group.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the selecting comprises: determining an average priority value of the single-network slice selection assistance information in each network slice simultaneous registration group, that has been normalized using the number of single-network slice selection assistance information in each network slice simultaneous registration group; and selecting the network slice simultaneous registration group with the highest average priority value.

In an example, the selecting a network slice simultaneous registration group using the information associated with network slice selection comprises: selecting the network slice simultaneous registration group using: i) the information associated with network slice selection, and ii) single-network slice selection assistance information associated with an application used in a user equipment.

In an example, the selecting a network slice simultaneous registration group using the information associated with network slice selection comprises: selecting the network slice simultaneous registration group using: i) the information associated with network slice selection, and ii) single-network slice selection assistance information associated with an existing protocol data unit session of a user equipment.

In an example, the retrieving information associated with network slice selection comprises: receiving, via a user input, the information associated with network slice selection.

In an example, the retrieving comprises at least one of: receiving from a network function, and retrieving an accessible configuration.

In an example, the providing comprises: determining at least one single-network slice selection assistance information associated with the selected network slice simultaneous registration group; and providing, to a network entity, a requested network slice selection assistance information comprising the determined at least one single-network slice selection assistance information.

In an example, the information associated with network slice selection is received in one of: a registration accept message, a configuration update command message, and a manage user equipment policy command message.

In an example, the method is performed by the user equipment.

According to an aspect, there is provided a method comprising: providing, to a user equipment, information associated with network slice selection, for the selection of a network slice simultaneous registration group at the user equipment; and receiving, from the user equipment, a requested network slice selection assistance information based on a first network slice simultaneous registration group selected by the user equipment.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the method comprises: providing, to the user equipment, single-network slice selection assistance information associated with an application used in a user equipment.

In an example, the method comprises: providing, to the user equipment, single-network slice selection assistance information associated with an existing protocol data unit session of a user equipment.

In an example, the method is performed by a network entity.

According to an aspect, there is provided an apparatus comprising: at least one processor, and at least one memory storing instructions that, when executed by the one or more processors, cause the apparatus to perform: retrieving information associated with network slice selection; selecting a network slice simultaneous registration group using the information associated with network slice selection; and providing, to a network entity, a requested network slice selection assistance information based on the selected network slice simultaneous registration group.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the selecting comprises: determining an average priority value of the single-network slice selection assistance information in each network slice simultaneous registration group, that has been normalized using the number of single-network slice selection assistance information in each network slice simultaneous registration group; and selecting the network slice simultaneous registration group with the highest average priority value.

In an example, the selecting a network slice simultaneous registration group using the information associated with network slice selection comprises: selecting the network slice simultaneous registration group using: i) the information associated with network slice selection, and ii) single-network slice selection assistance information associated with an application used in a user equipment.

In an example, the selecting a network slice simultaneous registration group using the information associated with network slice selection comprises: selecting the network slice simultaneous registration group using: i) the information associated with network slice selection, and ii) single-network slice selection assistance information associated with an existing protocol data unit session of a user equipment.

In an example, the retrieving information associated with network slice selection comprises: receiving, via a user input, the information associated with network slice selection.

In an example, the retrieving comprises at least one of: receiving from a network function, and retrieving an accessible configuration.

In an example, the providing comprises: determining at least one single-network slice selection assistance information associated with the selected network slice simultaneous registration group; and providing, to a network entity, a requested network slice selection assistance information comprising the determined at least one single-network slice selection assistance information.

In an example, the information associated with network slice selection is received in one of: a registration accept message, a configuration update command message, and a manage user equipment policy command message.

In an example, one of: the apparatus is for the user equipment, the apparatus is comprised in the user equipment, the apparatus is the user equipment.

According to an aspect, there is provided an apparatus comprising: at least one processor, and at least one memory storing instructions that, when executed by the one or more processors, cause the apparatus to perform: providing, to a user equipment, information associated with network slice selection, for the selection of a network slice simultaneous registration group at the user equipment; and receiving, from the user equipment, a requested network slice selection assistance information based on a first network slice simultaneous registration group selected by the user equipment.

In an example, the information associated with network slice selection comprises a priority value for a network slice access stratum group.

In an example, the information associated with network slice selection comprises a priority value for each of a plurality of network slice access stratum groups.

In an example, the information associated with network slice selection comprises an identification of the network slice access stratum group. In an example, the identified network slice access stratum group comprises at least one single-network slice selection assistance information.

In an example, the information associated with network slice selection comprises a priority value for each of a plurality of network slice access stratum groups.

In an example, the information associated with network slice selection comprises an indication to use the priority value of the network slice access stratum group when selecting the network slice simultaneous registration group.

In an example, the indication is an implicit indication, wherein the reception of the at least one priority value for a network slice access stratum group is the implicit indication.

In an example, the information associated with network slice selection comprises a priority value for a network slice simultaneous registration group.

In an example, the information associated with network slice selection comprises a priority value for each of a plurality of network slice simultaneous registration groups.

In an example, the information associated with network slice selection comprises a priority value for an application.

In an example, the information associated with network slice selection comprises a priority value associated with a traffic descriptor.

In an example, the traffic descriptor is of a user equipment route selection policy.

In an example, the information associated with network slice selection comprises a priority value for single-network slice selection assistance information.

In an example, the information associated with network slice selection comprises a priority value for each of a plurality of single-network slice selection assistance information.

In an example, the apparatus is caused to perform: providing, to the user equipment, single-network slice selection assistance information associated with an application used in a user equipment.

In an example, the apparatus is caused to perform: providing, to the user equipment, single-network slice selection assistance information associated with an existing protocol data unit session of a user equipment.

In an example, one of: the apparatus is for a network entity, the apparatus is comprised in the network entity, the apparatus is the network entity.

According to an aspect, there is provided a computer program comprising instructions, which when executed by an apparatus, cause the apparatus to perform the following: retrieving information associated with network slice selection; selecting a network slice simultaneous registration group using the information associated with network slice selection; and providing, to a network entity, a requested network slice selection assistance information based on the selected network slice simultaneous registration group.

According to an aspect, there is provided a computer program comprising instructions, which when executed by an apparatus, cause the apparatus to perform the following: providing, to a user equipment, information associated with network slice selection, for the selection of a network slice simultaneous registration group at the user equipment; and receiving, from the user equipment, a requested network slice selection assistance information based on a first network slice simultaneous registration group selected by the user equipment.

According to an aspect, there is provided a computer program comprising instructions stored thereon for performing at least the following: retrieving information associated with network slice selection; selecting a network slice simultaneous registration group using the information associated with network slice selection; and providing, to a network entity, a requested network slice selection assistance information based on the selected network slice simultaneous registration group.

According to an aspect, there is provided a computer program comprising instructions stored thereon for performing at least the following: providing, to a user equipment, information associated with network slice selection, for the selection of a network slice simultaneous registration group at the user equipment; and receiving, from the user equipment, a requested network slice selection assistance information based on a first network slice simultaneous registration group selected by the user equipment.

A computer product stored on a medium may cause an apparatus to perform the methods as described herein.

A non-transitory computer readable medium comprising program instructions, that, when executed by an apparatus, cause the apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

LIST OF ABBREVIATIONS

AF: Application Function
AMF: Access Management Function
AN: Access Network
AS: Access stratum
BS: Base Station
CN: Core Network
DL: Downlink
eNB: eNodeB
gNB: gNodeB
GSM: Global system for mobile communications
GSMA: GSM association
IIoT: Industrial Internet of Things
LTE: Long Term Evolution
NEF: Network Exposure Function
NG-RAN: Next Generation Radio Access Network
NF: Network Function
NR: New Radio
NRF: Network Repository Function
NW: Network
MS: Mobile Station
NSAG: Network slice AS group
NSSAI: Network slice selection assistance information
NSSRG: Network slice simultaneous registration group
PDU: Protocol data unit
PCF Policy Control Function
PLMN: Public Land Mobile Network
RAN: Radio Access Network
RF: Radio Frequency
SMF: Session Management Function
S-NSSAI: Single NSSAI
UE: User Equipment
UDR: Unified Data Repository
UDM: Unified Data Management
UL: Uplink
UPF: User Plane Function
URSP: UE route selection policy
3GPP: 3rd Generation Partnership Project
4G: 4th Generation
5G: 5th Generation
5GC: 5G Core network
5G-AN: 5G Radio Access Network
5GS: 5G System

DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
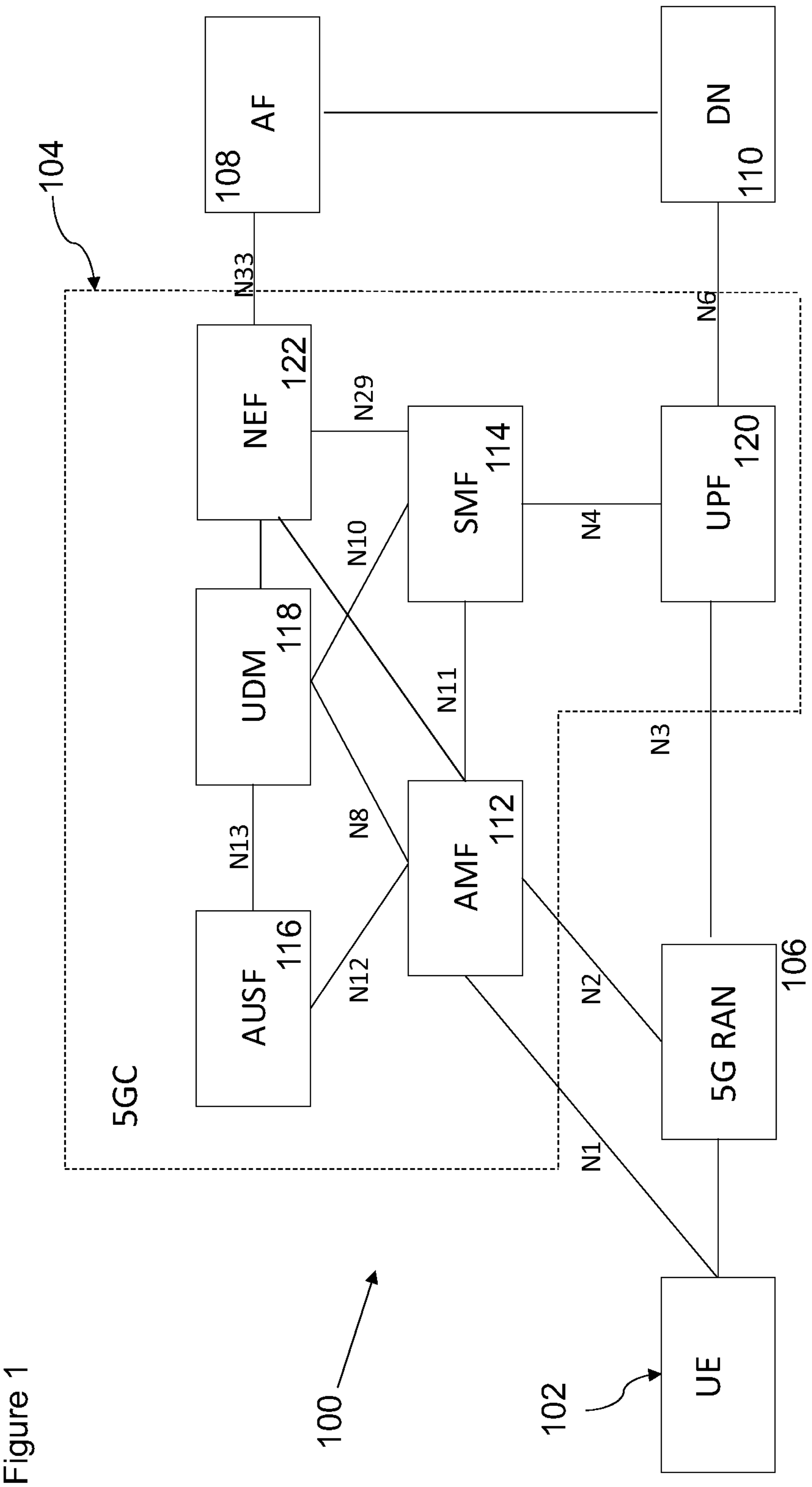
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of the disclosure, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a wireless communication system 100. The wireless communication system 100 may comprise one more devices 102 such as user equipments (UEs), or terminals. The wireless communication system 100 may also comprise a 5G system (5GS), as shown in Figure. The 5GS comprises a 5G radio access network (5G-RAN) 106, a 5G core network (5GC) 104 comprising one or more network functions (NF), one or more application functions (AFs) 108, and one or more data networks (DNS) 110.

The 5G-RAN 106 may comprise one or more gNodeB (gNB) distributed unit (DU) functions connected to one or more gNodeB (gNB) centralized unit (CU) functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 5G-advanced, 4G, 3G and other 3GPP standards.

In a wireless communication system 100, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a base station or access point, and transmit and/or receive communications on the carrier.

Figure 2:
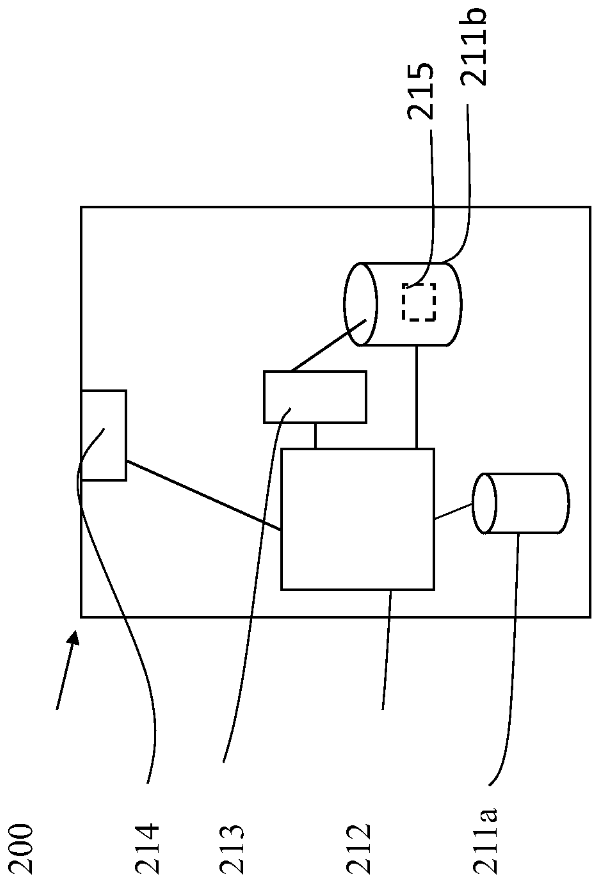
FIG. 2 shows a schematic representation of a control apparatus.

FIG. 2 illustrates an example of a control apparatus 200 for controlling a function of the 5G-RAN or the 5GC as illustrated on FIG. 1. The control apparatus may comprise at least one random access memory (RAM) 211*a*, at least one read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
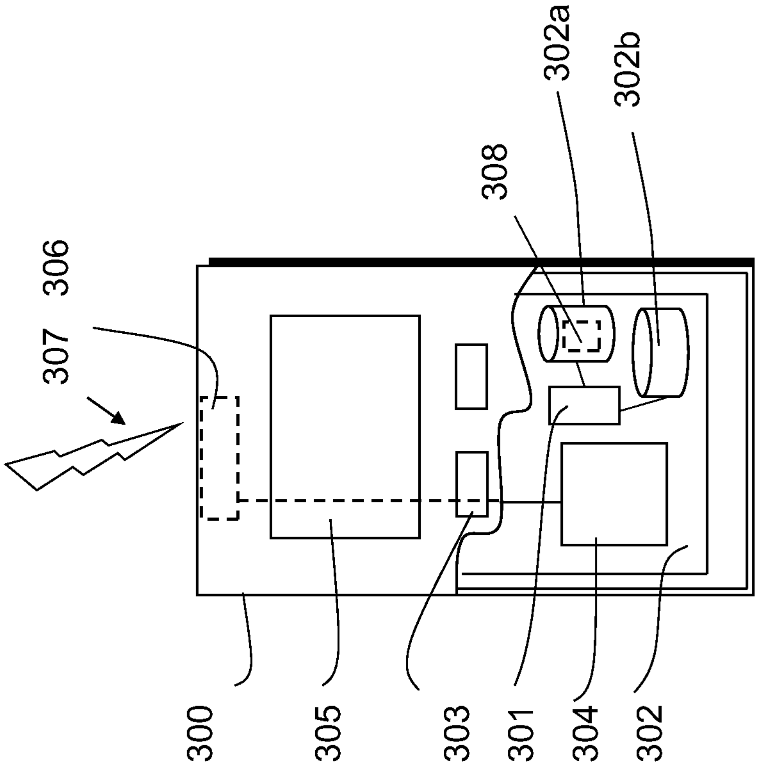
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Network slicing is a feature of 5G networks. A network slice is a logical end-to-end network that can be dynamically created. A UE may have access to multiple slices from the same gNB. Each network slice may serve a particular service type.

A network slice is defined within a public land mobile network (PLMN) and includes the 5GC and 5G RAN control plane and user plane. The network slices are identified using single network slice selection assistance information (S-NSSAI). NSSAI is a collection of S-NSSAIs. Currently, 3GPP allows up to eight S-NSSAIs in the NSSAI. This means that a single UE may be served by at most eight network slices at a time.

There are a number of types of NSSAIs. 'Subscribed S-NSSAIs' are stored in the UDM, and the 5GC uses this as a default when the UE does not send a requested NSSAI. 'Configured NSSAI' is a configuration from the PLMN, the PLMN configuring a UE with one or more configured NSSAIs. The UE uses this as its default NSSAI. This may be the same as the 'Subscribed S-NSSAIs'. 'Allowed NSSAI' is a group assigned by the 5GC and is valid in a registration area, or the PLMN, over a given access type. There may be a maximum of eight network slices within an allowed NSSAI. Using all eight network sluices would require the UE to establish eight protocol data unit (PDU) sessions. The allowed NSSAI may be signalled to a gNB using next generation application protocol (NGAP) initial context setup request message. The gNB may use this information when allocating resources for the UE. 'Requested NSSAI' may comprise either the 'configured' or 'allowed' NSSAI, or a combination of both. The UE sends a 'requested NSSAI' in RRC setup complete messages and/or non-access stratum (NAS) registration request messages.

In Rel-17, 3GPP introduced a network slice simultaneous registration group (NSSRG). Subscription information for a UE may include, for each S-NSSAI, NSSRG information identifying which S-NSSAIs can be simultaneously provided to the UE in the allowed NSSAI.

When S-NSSAIs have associated NSSRG information, then the S-NSSAIs in the 'allowed NSSAI' shall share at least one NSSRG. The NSSRG information, defining the association of S-NSSAIs to NSSRG, may be provided as additional/separate information. If the NSSRG information is not present for the S-NSSAIs of a subscription, and other restrictions do not apply, then it is assumed that all the S-NSSAIs in the subscription information are able to be simultaneously provided to the UE in the 'Allowed NSSAI'.

However, if NSSRG information is present in the subscription information, at least one NSSRG shall be associated with each of the S-NSSAIs in the subscription information. Said another way, the S-NSSAIs in the subscription information of the UE should have an NSSRG in common.

If an AMF has received subscription information for a UE that includes NSSRG information, the 'allowed NSSAI' for the UE shall include S-NSSAIs which share a common NSSRG.

The default S-NSSAIs (when more than one is present) are associated with the same NSSRGs. Said another way, the UE is allowed to be registered with all the default S-NSSAIs simultaneously. The home PLMN (HPLMN) sends S-NSSAIs sharing all the NSSRGs of the default S-NSSAIs to a non-supporting visited PLMN (VPLMN) as part of the subscription information. Said another way, in addition to the default S-NSSAI(s), the HPLMN may send any other subscribed S-NSSAI which shares at least all the NSSRGs defined for the default S-NSSAI(s). However, the HPLMN does not send NSSRG information to the VPLMN. UE subscription information that includes NSSRG information shall include at least one default S-NSSAI.

An access & mobility management function (AMF) or network slice selection function (NSSF), may receive a requested NSSAI. When it receives the requested NSSAI, the AMF/NSSF evaluates the S-NSSAIs of the HPLMN using any received NSSRG information for these S-NSSAIs, in order to determine whether the requested NSSAI can be provided together in the 'allowed NSSAI'.

An HPLMN enabling support of subscription-based restrictions to simultaneous registration of network slices for a subscriber may set the subscribed S-NSSAI(s) already in the subscription information before the NSSRG information was added to the subscription information. A result being to have the same NSSRGs defined for the default S-NSSAI(s) if the HPLMN continues to support the same service behaviour for these S-NSSAIs.

A plurality of network slices may be grouped together into a so-called network slice access stratum group (NSAG). A priority value (or priority level) may be indicated per network slice or per group of network slices (i.e. per NSAG).

It should be understood that in the following examples, the terms priority value and priority level may be used interchangeably.

When a UE that does not support NSSRG requests one or more network slices, the UE may request one or more network slices unless the number of network slices which the UE wants to request exceeds eight. If the number of network slices which the UE wants to request exceeds eight, the UE may select eight network slices which are the most important to the UE. However, the evaluation and selection performed by the UE has not been standardized.

When a UE does support NSSRG, the UE evaluates which NSSRG is more important/is a priority. If the UE continues to evaluate importance of network slices (only), and requests network slices based on the evaluation result, the UE may request network slices which do not share a common NSSRG value. This would be in conflict with the expected behaviour from the NSSRG configuration by the network.

One or more of the examples below address what should be considered by a UE to determine the importance of an NSSRG.

In examples, an apparatus (e.g. a UE) retrieves information associated with network slice selection, selects an NSSRG using the information associated with network slice selection. The apparatus then provides, to a network entity (e.g. an AMF, or a PCF), a requested NSSAI based on the selected NSSRG.

This will be described in more detail below.

Figure 4:
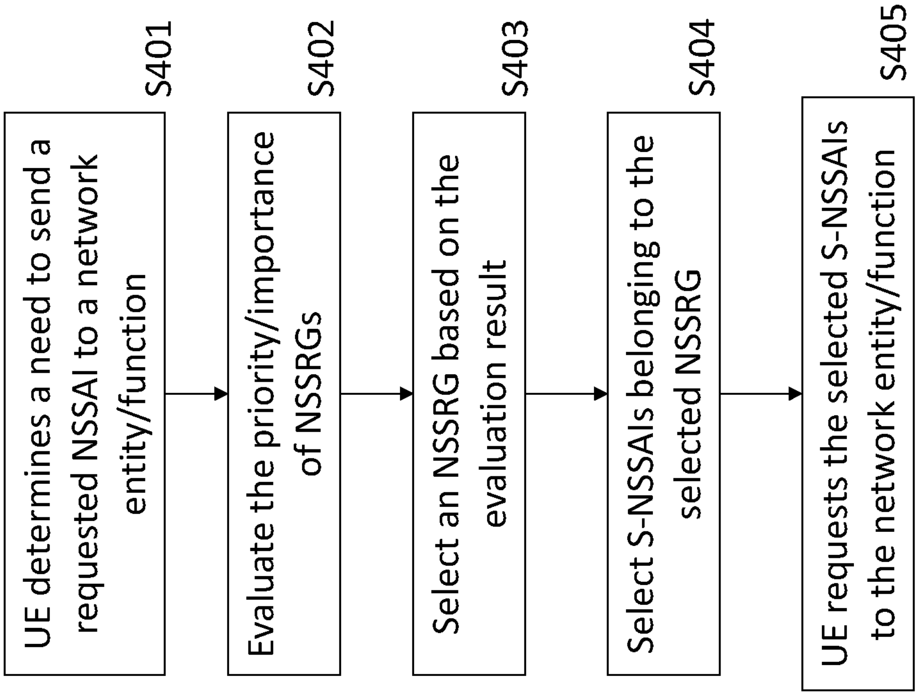
FIG. 4 shows a method flow diagram for a user equipment.

FIG. 4 shows a method flow diagram for a user equipment.

At S401, the UE determines a need to send a requested NSSAI to a network.

At S402, the UE evaluates a priority or importance level of one or more NSSRGs.

At S403, the UE selects an NSSRG based on the evaluation (performed at S402). For example, the UE may select the NSSRG with the highest priority/importance level.

At S404, the UE selects the S-NSSAIs that belong to the selected NSSRG.

At S405, the UE provides a request to the network for the selected S-NSSAIs. The request may be in the form of a requested NSSAI, in some examples.

It should be understood that some of the above steps may not be performed in some examples, or performed in a different order.

In an example, when a UE determines to trigger a registration, the UE determines an NSSRG with a highest priority (level/value), and requests one or more network slices belonging to the NSSRG.

The UE may use information accessible to the UE when evaluating the priority level/importance level of the NSSRG. In information may be referred to as input parameters. The input parameters to determine importance/priority of an NSSRG may include at least one of: S-NSSAIs belonging to each NSSRGs, priority values of NSAGs, S-NSSAIs belonging to each NSAG, an indication from the network to consider priority values for evaluating importance of NSSRGs, priority values of NSSRGs from the network, policies from the network, an input from a user, S-NSSAIs associated with applications in the UE, and S-NSSAIs associated with existing PDU session(s) at the UE. The S-NSSAIs associated with applications in the UE may be determined according to UE selection policies (URSPs), or UE local configurations.

An example of application in the UE may be an application requiring a connection to a data network that is running in/on the UE. An example of such application may be Netflix (registered trademark (RTM)) or YouTube®. The application may be any application that exchanges data with the data network, or exchanges data with an application server.

Figure 5:
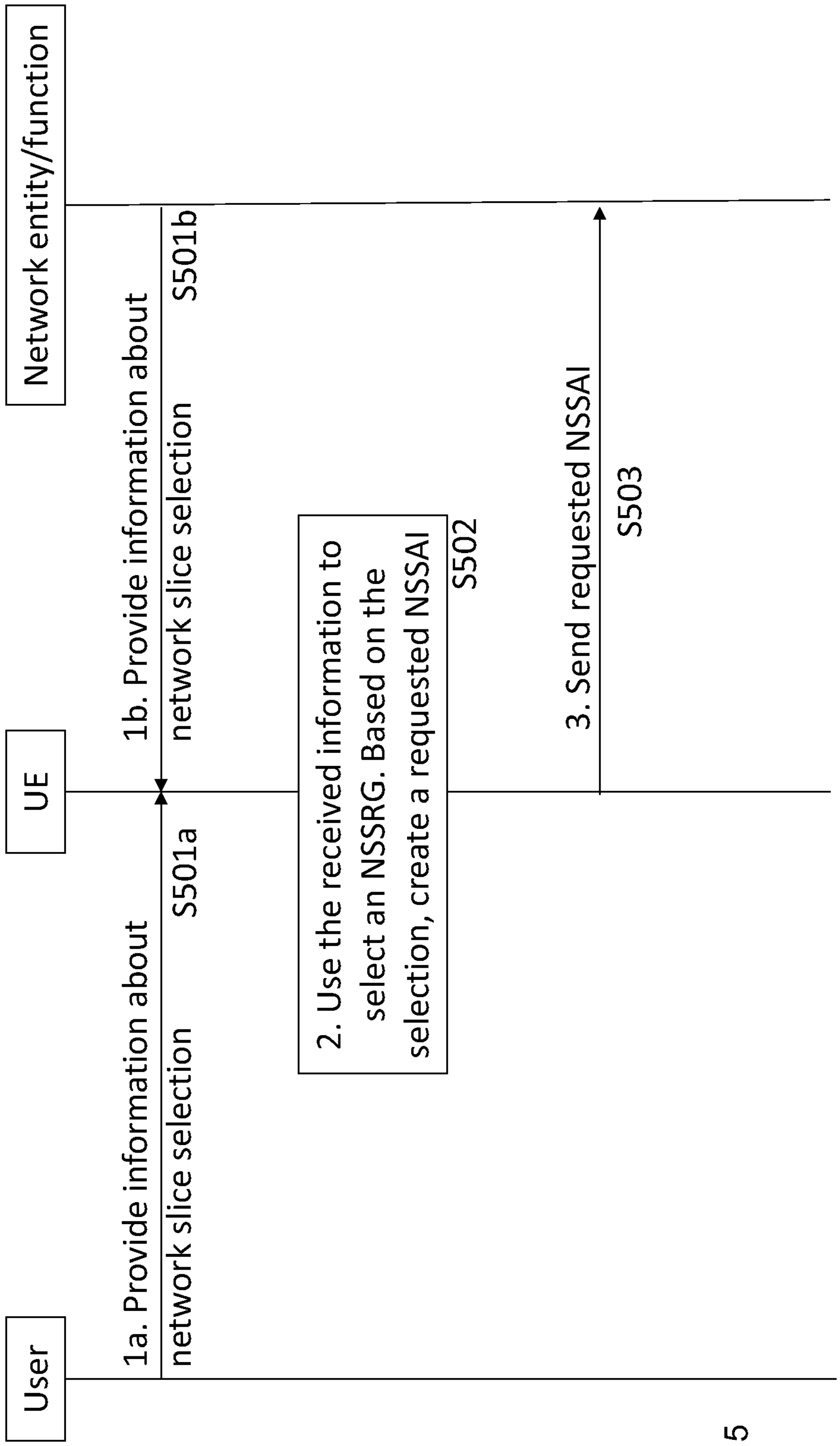
FIG. 5 shows an example signalling diagram between a user equipment, a user and a network entity.

FIG. 5 shows an example signalling diagram between a user equipment, a user and a network entity. The network entity may be referred to as a network function ins some examples. It should be understood that the terms network entity and network function may be used interchangeably.

At S501*a*, a user provides information about network slice selection to a user equipment. The user may provide the information through a user input. For example, the user may be using the user equipment. The user may provide the input through any suitable means, for example, touch, voice, etc. The user input may include an explicit involvement by the user. For example, the user input may be a trigger when the user moves into or out of a certain area. In other examples, any other implicit user input may be provided to the user equipment.

At S501*b*, a network entity/network function provides information about network slice selection to the user equipment. The terms ‘network entity’ and ‘network function’ may be used interchangeably. In some examples, the network entity/network function may be an AMF, or a PCF. The information about network slice selection may be provided by the network entity/network function to the user equipment via a gNB.

At S502, the UE uses the received information about network slice selection to select an NSSRG. In some examples, the UE may use information from the user, or the network entity/network function. In other examples, the UE may use received information from both the user and the network entity/network function.

In some examples, the UE may use configured information to select an NSSRG. For example, during a certain period of time (e.g., from 10 PM to 6 AM), a first NSSRG is selected. During other times (e.g., from 6 AM to 10 PM), a second NSSRG is selected (wherein the first and second NSSRGs are different). The configured information may be used in addition to the received information in some examples. In other examples, the configured information is used instead of the received information.

At S503, based on the selection, the UE provides a requested NSSAI to the network entity/network function. In some examples, the UE may provide the requested NSSAI to a different network entity/network function that the information was received from. The requested NSSAI may comprise one or more S-NSSAIs associated with the selected NSSRG.

Figure 6:
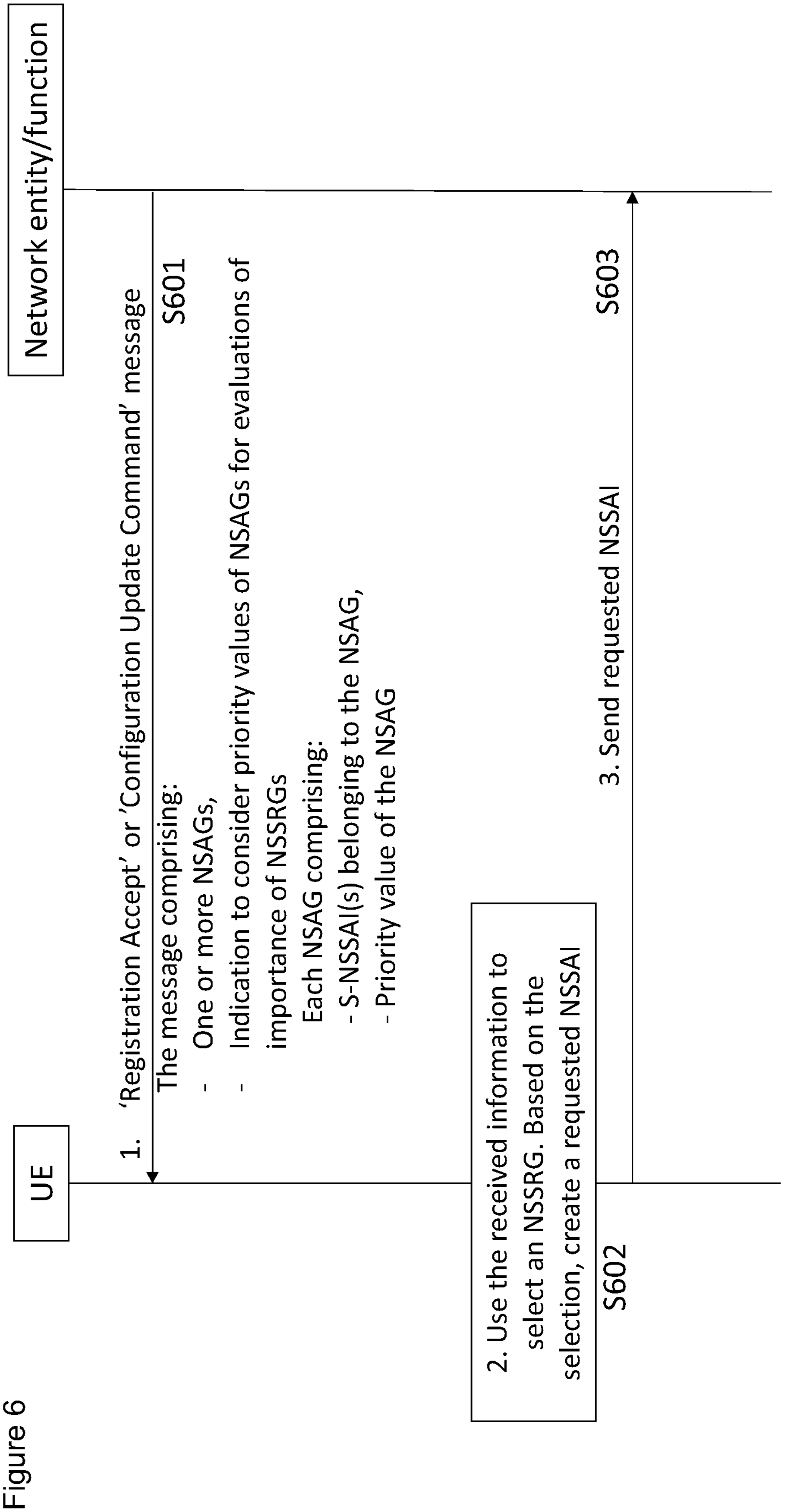
FIG. 6 shows an example signalling diagram between a user equipment and a network entity.

FIG. 6 shows an example signalling diagram between a user equipment and a network entity.

FIG. 6 shows an example wherein information about network slice selection comprises at least one of: priority values of NSAGs, S-NSSAIs belonging to each NSAG and, an indication to consider the priority values of NSAGs for evaluating importance of NSSRGs.

At S601, a network function (also referred to as a network entity) provides a message to a UE. The message comprises information associated with network slice selection.

The information associated with network slice selection may comprise information related to at least one NSAG. The message may also comprise an indication to consider priority values of NSAGs for evaluations of importance of NSSRGs. In some examples, the indication is not provided, but the provision of the information related to the one or more NSAGS is an implicit indication that the priority value of the one or more NSAGs should be utilised.

The information related to each NSAG may comprise at least one S-NSSAI(s) belonging to the NSAG, and a priority value of the NSAG. The priority value may be in the form of a number, a discrete level, a category, or any other suitable indication. For example, information related to a first NSAG comprises S-NSSAIs: S-NSSAI 3, S-NSSAI 7, S-NSSAI 9, wherein the priority level of the first NSAG is two. There may be priority levels 1 to 5, with 1 being the highest priority.

The message may be one of: a registration accept message, or a configuration update command message. In other examples, other suitable message types are used.

The network function may be an AMF, in some examples. The network function may be a PCF, in some examples.

At 602, the UE receives the message from the network function. The UE uses the information associated with network slice selection within the message to select an NSSRG.

Based on the selection of the NSSRG, the UE determines a requested NSSAI. The determination of the requested NSSAI may comprise the UE determining the S-NSSAIs that are comprised within the NSSRG. The S-NSSAI(s) of the selected NSSAI may be provided in the requested NSSAI.

At S603, the UE provides to requested NSSAI to the network function.

In some examples, the UE provides the requested NSSAI to the same network function that provided the message. In other examples, the UE provides the requested NSSAI to a different network function.

As an example, if a first NSSRG (called ‘NSSRG A’) comprises a first network slice (called ‘S-NSSAI X’), then NSSRG A={S-NSSAI X}. A UE may be aware of NSSRG A, as well as NSSRG B, wherein NSSRG B={S-NSSAI Y}. The UE may receive, or have access to, information that a first NSAG (called ‘NSAG 1’) has a higher priority level/importance level than a second NSAG (called ‘NSAG 2’), wherein NSAG 1={S-NSSAI X} and NSAG 2={S-NSSAI Y}. Thus, if other conditions are the same at the UE, then the UE selects NSSRG A (instead of NSSRG B). The UE then requests S-NSSAI X to the network. This is because S-NSSAI X is comprised within NSSRG A. An example of the ‘other conditions’ being the same is one application of the UE requesting S-NSSAI X and another application requesting S-NSSAI Y, with those applications having the same priority/significance. In this way, both S-NSSAI X and S-NSSAI Y are useful for the UE.

As another example, a UE is aware of NSSRG A={S-NSSAI X}, and NSSRG B={S-NSSAI Y}. The UE may receive, or have access to, information that NSAG 1={S-NSSAI X} that has a higher priority than NSAG 2={S-NSSAI Y}. The UE has an established PDU session associated with S-NSSAI Y. In this example, it may not be clear whether the UE should select NSSRG A or NSSRG B. This is because NSAG 1 comprising S-NSSAI X has a higher priority, but the UE has a PDU session with S-NSSAI Y of NSAG 2.

In this example, when session continuity is more important for the UE, the UE may select NSSRG B. Alternatively, when the configured priority for a (group of) network slices matters more, the UE may select NSSRG A.

The session continuity may be considered to be a network requirement. Other factors may also be considered network requirements. The session continuity as a network requirement may be signalled to the UE.

The network may provide an indication indicating which factor (e.g. session continuity, or configured priority) should be prioritised. In other examples, the UE may be pre-configured with the indication.

NSSRG and NSAG may be considered as two independent features. For example, a UE and/or a network may be able to support either, or both, of the two features. Therefore, the network may indicate to the UE to consider the priority values associated with NSAGs for evaluating importance of NSSRGs.

Figure 7:
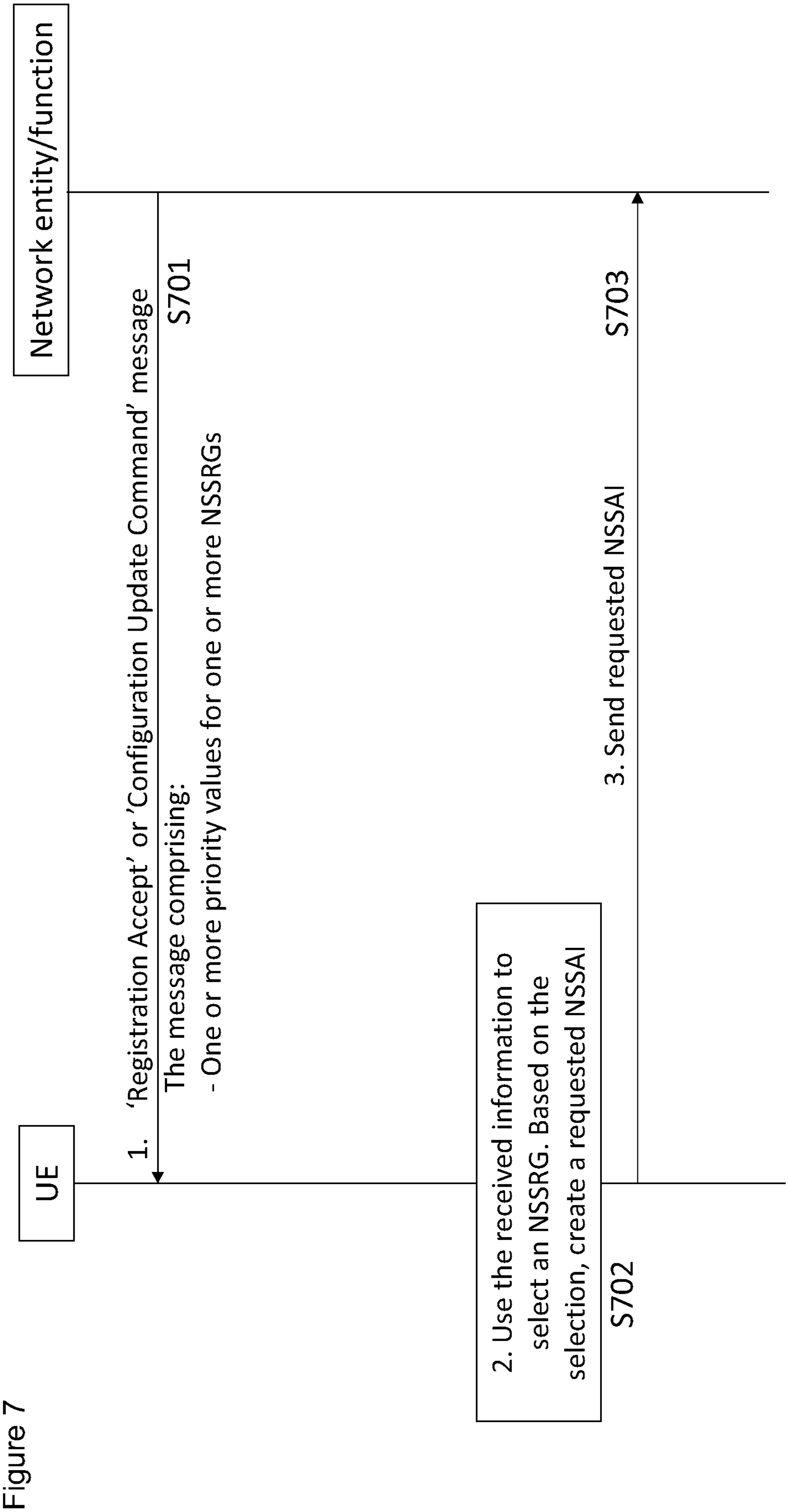
FIG. 7 shows an example signalling diagram between a user equipment and a network entity.

FIG. 7 shows an example signalling diagram between a user equipment and a network entity.

FIG. 7 shows an example wherein information about network slice selection comprises a priority value for at least one NSSRG. In examples with a plurality of NSSRGs, a priority value is provided for each NSSRG.

At S701, a network function (also referred to as a network entity) provides a message to a UE. The message comprises information associated with network slice selection.

The information associated with network slice selection may comprise a priority value for at least one NSSRG. In examples with a plurality of NSSRGs, a priority value is provided for each NSSRG.

The message may be one of: a registration accept message, or a configuration update command message. In other examples, other suitable message types are used.

The network function may be an AMF, in some examples. The network function may be a PCF, in some examples.

At 702, the UE receives the message from the network function. The UE uses the information associated with network slice selection within the message to select an NSSRG.

Based on the selection of the NSSRG, the UE determines a requested NSSAI. The determination of the requested NSSAI may comprise the UE determining the S-NSSAIs that are comprised within the NSSRG. The S-NSSAI(s) of the selected NSSAI may be provided in the requested NSSAI.

At S703, the UE provides to requested NSSAI to the network function.

In some examples, the UE provides the requested NSSAI to the same network function that provided the message. In other examples, the UE provides the requested NSSAI to a different network function.

As an example, a network function may provide, to a UE, an indication of priorities for each of plurality of NSSRGs. NSSRG 1 has a priority value of 2, NSSRG 2 has a priority value of 4, and NSSRG 3 has a priority value of 1. In this example there are priority values of 1 to 5, wherein 5 is the highest priority. When the UE is to determine which NSSRG to select, the UE uses the received indications of priorities, and selects NSSRG 3. This is because it has the highest priority value.

Figure 8:
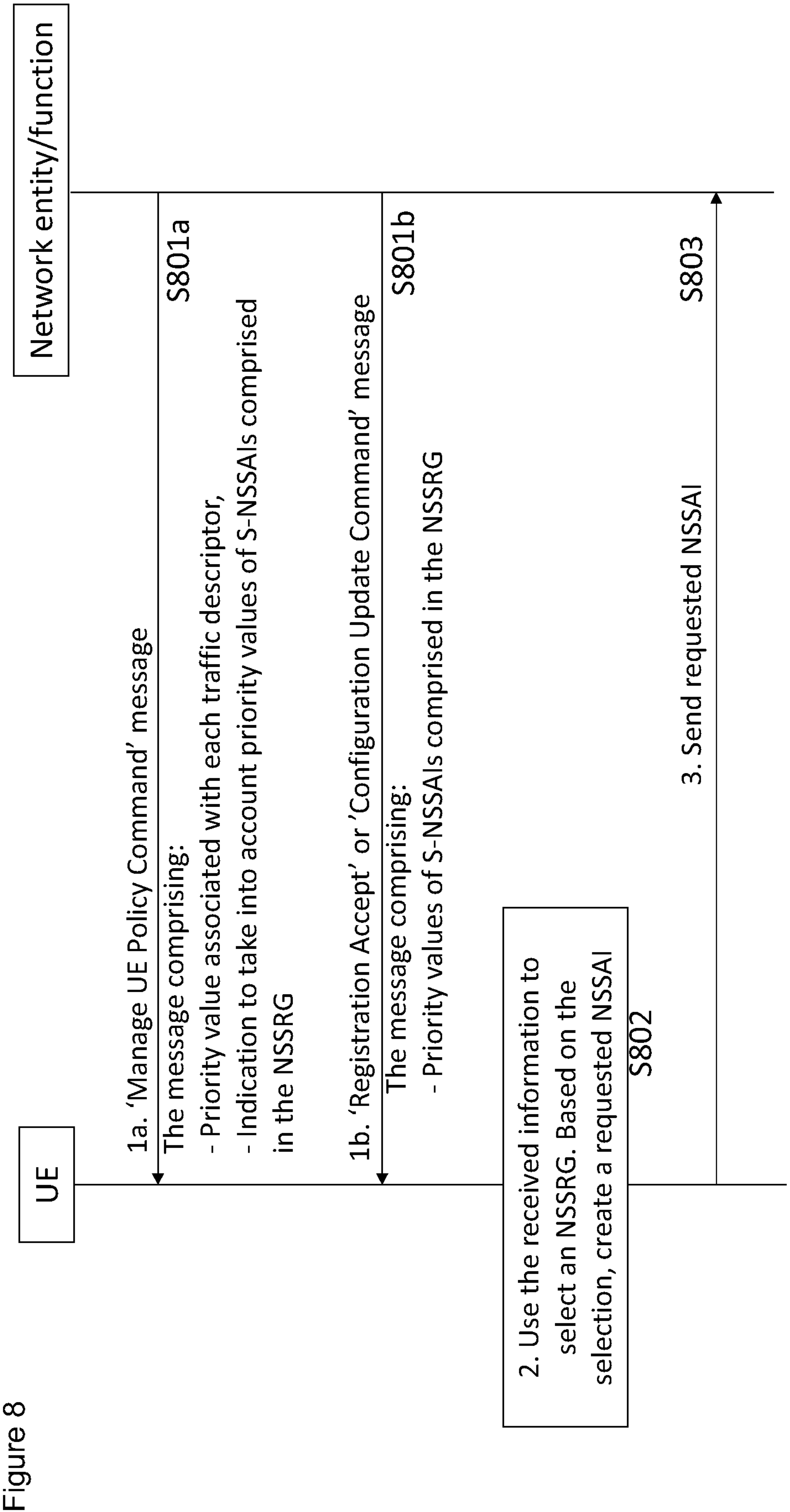
FIG. 8 shows an example signalling diagram between a user equipment and a network entity.

FIG. 8 shows an example signalling diagram between a user equipment and a network entity.

FIG. 8 shows an example wherein information about network slice selection comprises at least one of: a priority value associated with at least one traffic descriptor, priority values of S-NSSAIs comprised in the NSSRG, and an indication to consider priority values of S-NSSAIs comprised in the NSSRG.

At S801*a*, a network function (also referred to as a network entity) provides a message to a UE. The message comprises information associated with network slice selection.

The information associated with network slice selection may comprise a priority value associated with at least one traffic descriptor. In examples with a plurality of traffic descriptors, a priority value is provided for each traffic descriptor. The message may also comprise an indication to consider priority values of S-NSSAIs comprised in the NSSRG.

The message may be a manage UE policy command message, in some examples. In other examples, other suitable message types are used.

At S801*b*, the network function provides a further message to a UE. The further message comprises information associated with network slice selection.

The information associated with network slice selection may comprise a priority value of at least one S-NSSAI comprised in a NSSRG. In examples with a plurality of S-NSSAIs in the NSSRG, a priority value is provided for each S-NSSAI.

The further message may be one of: a registration accept message, or a configuration update command message. In other examples, other suitable message types are used.

The network function may be an AMF, in some examples. The network function may be a PCF, in some examples. When the message/further message is a manage UE policy command message, the network function may be a PCF.

In some examples, the network function sends either the message or the further message. In other examples, the network function sends both the message and the further message.

At S802, the UE receives at least one of: the message, and the further message, from the network function. The UE uses the information associated with network slice selection within the message to select an NSSRG.

Based on the selection of the NSSRG, the UE determines a requested NSSAI. The determination of the requested NSSAI may comprise the UE determining the S-NSSAIs that are comprised within the NSSRG. The S-NSSAI(s) of the selected NSSAI may be provided in the requested NSSAI.

At S803, the UE provides to requested NSSAI to the network function.

In some examples, the UE provides the requested NSSAI to the same network function that provided the message. In other examples, the UE provides the requested NSSAI to a different network function.

In examples, one or more network policies may be determined by a network for a UE.

For example, a network policy may be associated with priorities of specified applications, which may then be provided to the UE. The priorities of applications may be provided as part of a UE route selection policy (URSP). For example, a traffic descriptor in a URSP rule may be associated with a priority value. The priority value of the traffic descriptor in the URSP rule may be used by the UE to determine which NSSRG to select, in order to determine a requested NSSAI.

In an example, another network policy is an indication whether to consider the priority of S-NSSAIs comprised in a NSSRG, when the UE is determining the priority/importance of NSSRGs. These S-NSSAI priorities may be received during a registration procedure at the UE, wherein the network may indicate to consider these priority values for NSSRG evaluation purposes. Alternatively the UE may autonomously determine to consider the S-NSSAI priory values when selecting the NSSRG. For example, the UE may select the NSSRG that comprises the S-NSSAI with the highest/best priority value. Said another way, the UE selects the NSSRG with the most important slice.

In some examples, other algorithms may be utilised by the UE when determining an NSSRG. For example, determining an average priority of the network slices (i.e. S-NSSAIs) in each NSSRG, that has been normalized using the number of network slices in each NSSRG. It should be understood that this is given as an example only, and that other algorithms may be implemented in other examples.

Figure 9:
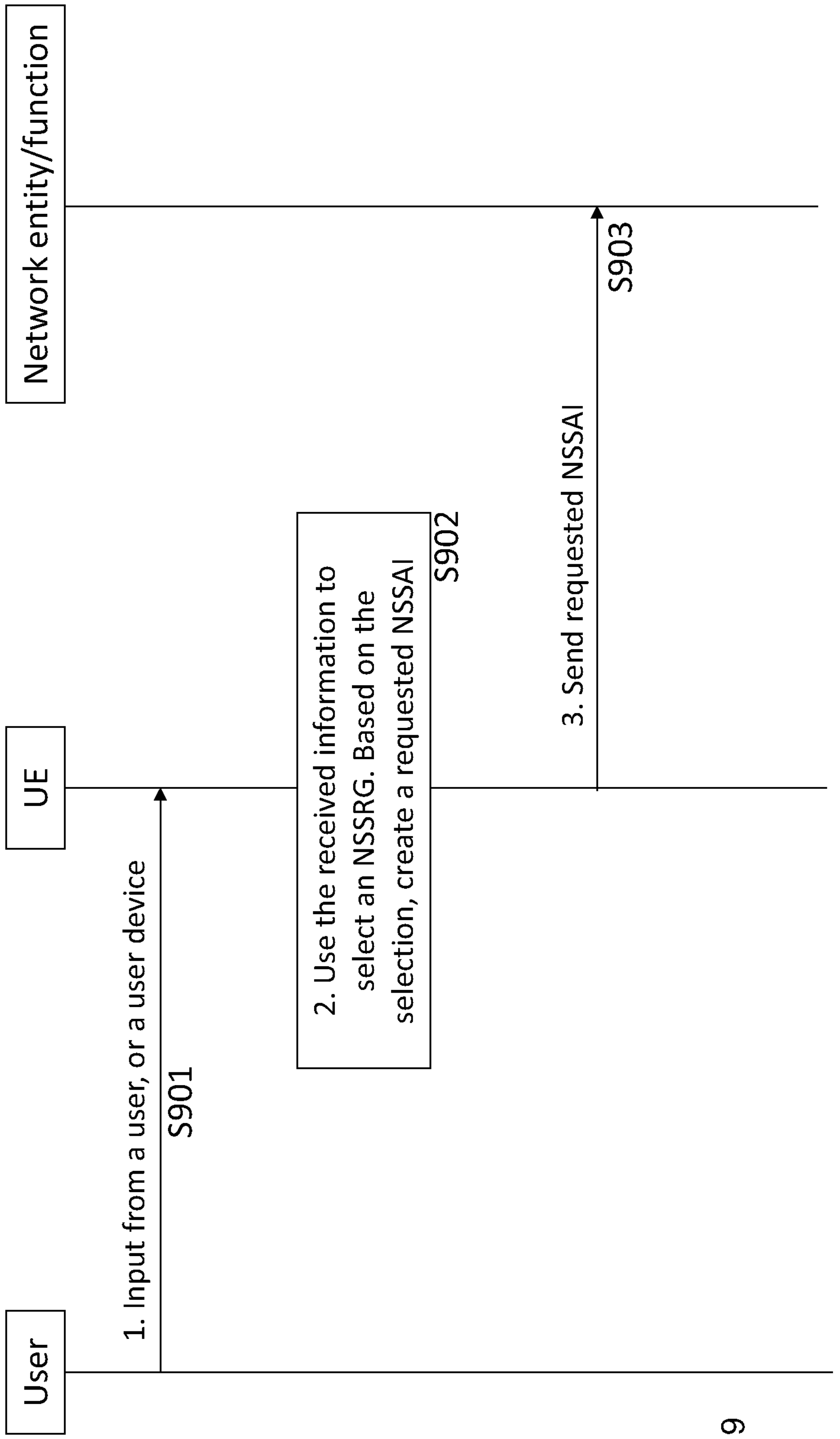
FIG. 9 an example signalling diagram between a user equipment, a user and a network entity.

FIG. 9 an example signalling diagram between a user equipment, a user and a network entity.

FIG. 9 shows an example wherein information about network slice selection comprises information from a user input.

At S901, a user provides a message to a UE. The user may be a user of the UE. The message may be a user input into the UE. For example, a touch input, voice input, etc. In other examples, a user device provides the message to the UE.

The message comprises information associated with network slice selection.

At 902, the UE receives the message. The UE uses the information associated with network slice selection within the message to select an NSSRG.

Based on the selection of the NSSRG, the UE determines a requested NSSAI. The determination of the requested NSSAI may comprise the UE determining the S-NSSAIs that are comprised within the NSSRG. The S-NSSAI(s) of the selected NSSAI may be provided in the requested NSSAI.

At S903, the UE provides to requested NSSAI to a network function. The network function may be an AMF, in some examples. The network function may be a PCF, in some examples.

For example, a user of a UE may be a train driver. The UE of the train driver is configured to switch between two modes. For example, an 'on-duty' mode, and a 'personal-use' mode. The UE may provide a user interface (UI) so that a user may switch between the two modes. For example, a touch input on the UI may trigger a switch between modes. When a train driver goes 'on-duty' (i.e. is driving a train), the train driver can switch the UE to 'on-duty' mode. This selection of 'on-duty' mode may trigger the UE to select a NSSRG for on-duty mode. The NSSRG for 'on-duty' mode may be pre-configured. When the train driver finishes work, the train driver can switch the UE to 'personal-use' mode. This change triggers the UE to select a different NSSRG that is associated with the 'personal-use' mode. It should be understood that this has been given as an example only to aid in the understanding of the FIG. 9.

The examples of FIGS. 5 to 9 may be used in combination. In some examples, information provided to the UE in FIGS. 5 to 9 may be provided together, wherein the combined information is used to determine the requested NSSAI.

One or more of the examples above provide a means for a device, such as a UE, to request one or more S-NSSAIs which share at least one common NSSRG value. In this way, there is the advantage that a number of different factors may be taken into account when determining the importance or priority of NSSRGs. With the NSSRG restriction, the UE evaluates which NSSRG is more important. Otherwise, if a UE continues to evaluate the importance of network slices only, and request network slices based on the evaluation result, the UE may request network slices that do not share a common NSSRG. This would be in conflict with the expected behaviour from the NSSRG configuration by the network, which could reduce user experience or cause network errors.

Figure 10:
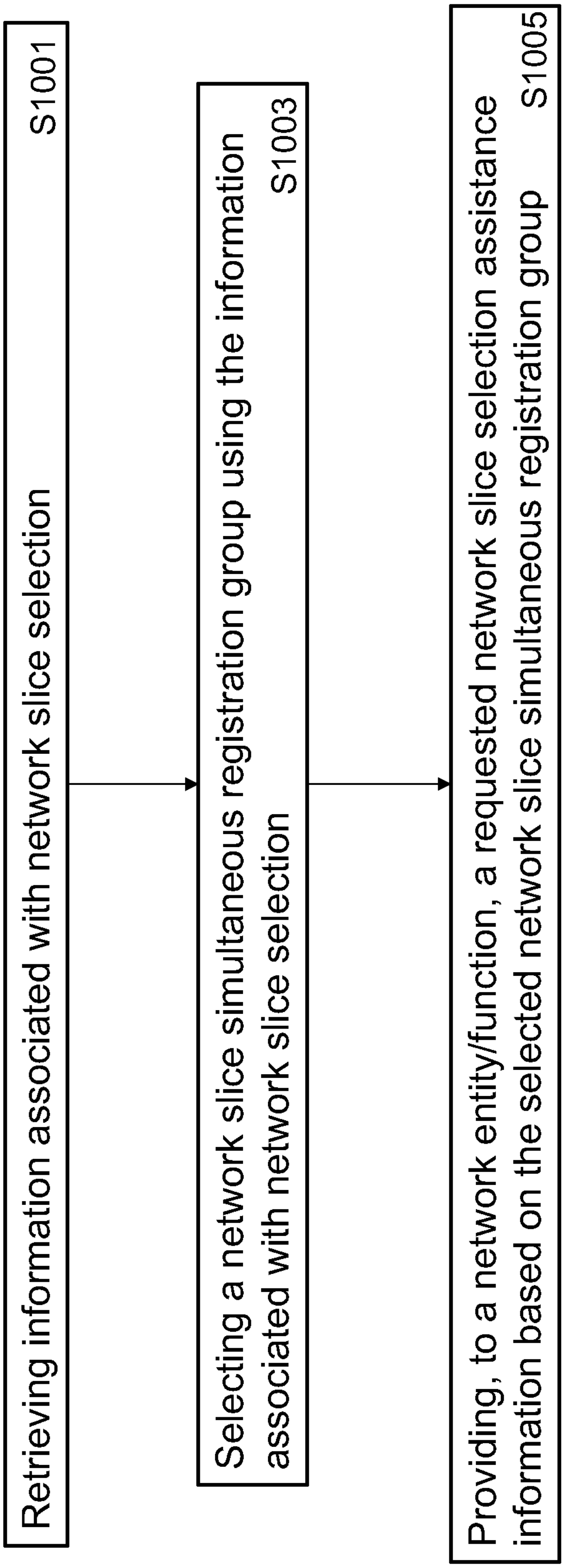
FIG. 10 shows another example method flow diagram performed by an apparatus.

FIG. 10 shows an example method flow performed by an apparatus. The apparatus may be for a user equipment. The apparatus may be comprised in a user equipment. The apparatus may be a user equipment. In other words, in some examples, a user equipment may be provided including the described apparatus and at least one of: a baseband module, and a modem.

In S1001, the method comprises retrieving information associated with network slice selection.

In S1003, the method comprises selecting a network slice simultaneous registration group using the information associated with network slice selection.

In S1005, the method comprises providing, to a network entity, a requested network slice selection assistance information based on the selected network slice simultaneous registration group.

Figure 11:
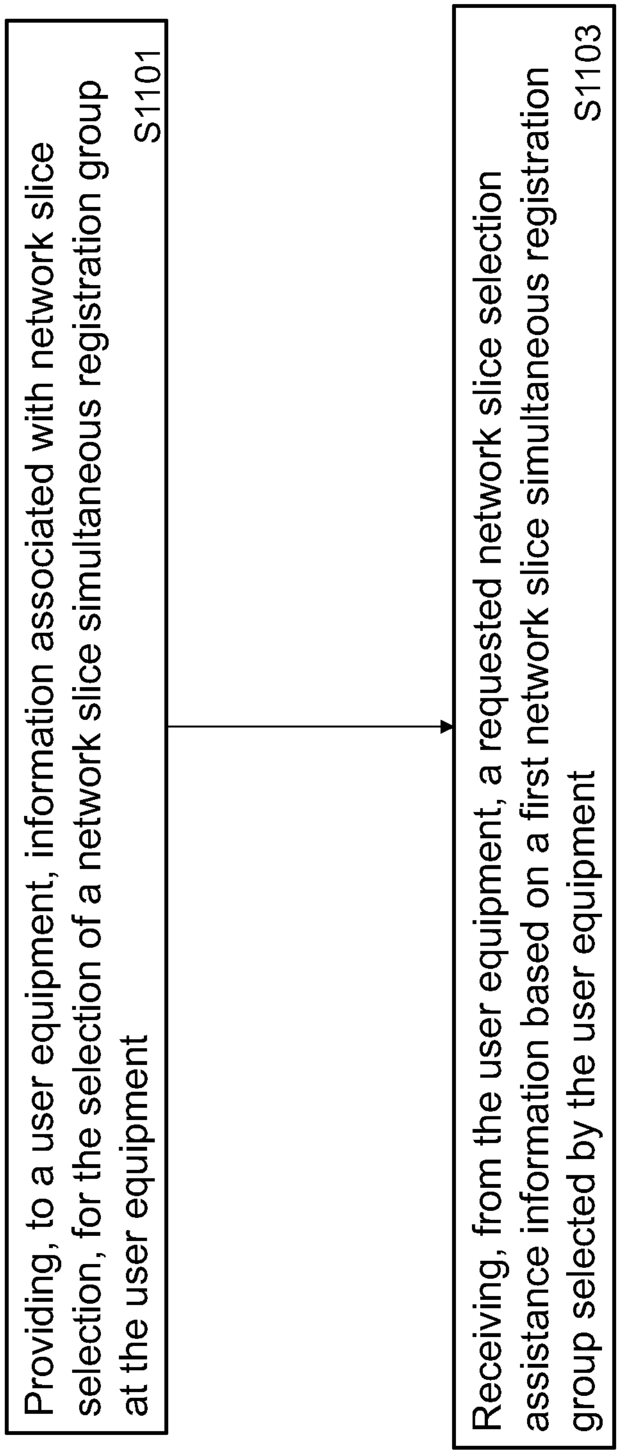
FIG. 11 shows another example method flow diagram performed by a further apparatus.

FIG. 11 shows an example method flow performed by an apparatus. The apparatus may be for a network entity. The apparatus may be a network entity. The network entity may be a network function, a network device, a base station, or any other suitable network entity.

In S1101, the method comprises providing, to a user equipment, information associated with network slice selection, for the selection of a network slice simultaneous registration group at the user equipment.

In S1103, the method comprises receiving, from the user equipment, a requested network slice selection assistance information based on a first network slice simultaneous registration group selected by the user equipment.

Figure 12:
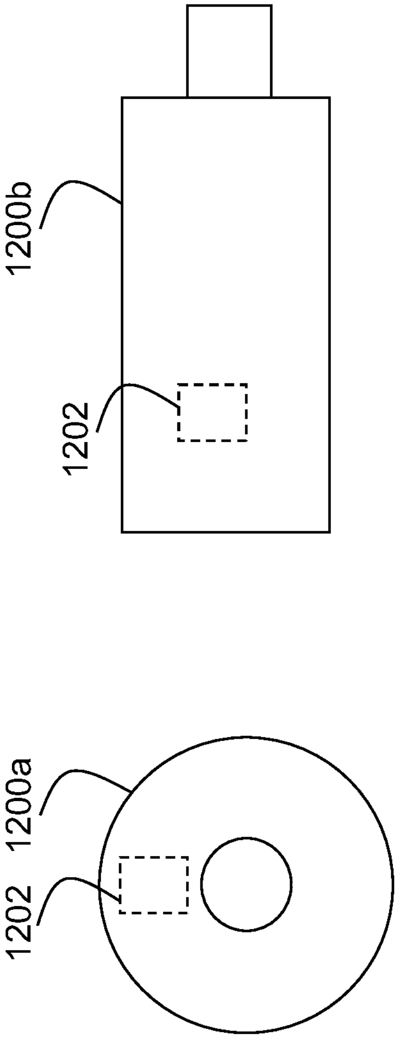
FIG. 12 shows a schematic representation of a non-volatile memory medium storing instructions which when executed by a processor allow a processor to perform one or more of the steps of the methods of FIGS. 10 and 11.

FIG. 12 shows a schematic representation of non-volatile memory media 1200*a* (e.g., computer disc (CD) or digital versatile disc (DVD)) and 1200*b* (e.g. universal serial bus (USB) memory stick) storing instructions and/or parameters 1202 which when executed by a processor allow the processor to perform one or more of the steps of the methods of FIG. 10 or 12.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The term "non-transitory", as used herein, is a limitation of the medium itself (i.e. tangible, not a signal) as opposed to a limitation on data storage persistency (e.g. RAM vs ROM).

As used herein, "at least one of the following: <a list of two or more elements>" and "at least one of: <a list of two or more elements>" and similar wording, where the list of two or more elements are joined by "and", or "or", mean at least any one of the elements, or at least any two or more of the elements, or at least all of the elements.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:

at least one processor;

at least one memory storing instructions which when executed by the at least one processor cause the apparatus to perform at least:

retrieving information associated with network slice selection;

selecting a network slice simultaneous registration group using the information associated with network slice selection; and providing, to a network entity, a requested network slice selection assistance information based on the selected network slice simultaneous registration group, wherein the information associated with network slice selection comprises at least one of:

a priority value for a network slice simultaneous registration group;

a priority value for an application;

a priority value associated with a traffic descriptor; or a priority value for single-network slice selection assistance information, and wherein the selecting comprises:

determining an average priority value of the single-network slice selection assistance information in each network slice simultaneous registration group, that has been normalized using the number of single-network slice selection assistance information in each network slice simultaneous registration group; and selecting the network slice simultaneous registration group with the highest average priority value.

2. The apparatus according to claim 1, wherein the information associated with network slice selection comprises a priority value for a network slice access stratum group.

3. The apparatus according to claim 2, wherein the information associated with network slice selection comprises an indication to use the priority value of the network slice access stratum group when selecting the network slice simultaneous registration group.

4. The apparatus according to claim 1, wherein the selecting a network slice simultaneous registration group using the information associated with network slice selection comprises:

selecting the network slice simultaneous registration group using: i) the information associated with network slice selection, and ii) single-network slice selection assistance information associated with an application used in a user equipment.

5. The apparatus according to claim 1, wherein the selecting a network slice simultaneous registration group using the information associated with network slice selection comprises:

selecting the network slice simultaneous registration group using: i) the information associated with network slice selection, and ii) single-network slice selection assistance information associated with an existing protocol data unit session of a user equipment.

6. The apparatus according to claim 1, wherein the retrieving information associated with network slice selection comprises:

receiving, via a user input, the information associated with network slice selection.

7. The apparatus according to claim 1, wherein the retrieving comprises at least one of: receiving from a network function or retrieving an accessible configuration.

8. The apparatus according to claim 1, wherein the providing comprises:

determining at least one single-network slice selection assistance information associated with the selected network slice simultaneous registration group; and providing, to a network entity, a requested network slice selection assistance information comprising the determined at least one single-network slice selection assistance information.

9. The apparatus according to claim 1, wherein the information associated with network slice selection is received in one of: a registration accept message, a configuration update command message, and a manage user equipment policy command message.

10. An apparatus comprising:

at least one processor, at least one memory storing instructions of a network function, wherein the instructions when executed by the at least one processor causes the apparatus to at least perform:

providing, to a user equipment, information associated with network slice selection, for the selection of a network slice simultaneous registration group at the user equipment, wherein the information associated with network slice selection comprises at least one of:

a priority value for a network slice simultaneous registration group;

a priority value for an application;

a priority value associated with a traffic descriptor; or a priority value for single-network slice selection assistance information; and receiving, from the user equipment, a requested network slice selection assistance information based on a first network slice simultaneous registration group selected by the user equipment based on a determination of an average priority value of the single-network slice selection assistance information in each network slice simultaneous registration group, that has been normalized using the number of single-network slice selection assistance information in each network slice simultaneous registration group and a determination of the network slice simultaneous registration group with the highest average priority value.

11. The apparatus according to claim 10, wherein the information associated with network slice selection comprises a priority value for a network slice access stratum group.

12. The apparatus according to claim 11, wherein the information associated with network slice selection comprises an indication to use the priority value of the network slice access stratum group when selecting the network slice simultaneous registration group.

13. The apparatus according to claim 10, wherein the information associated with network slice selection comprises at least one of:

a priority value for a network slice simultaneous registration group;

a priority value for an application;

a priority value associated with a traffic descriptor; or a priority value for single-network slice selection assistance information.

14. A method comprising:

retrieving, by an apparatus, information associated with network slice selection;

selecting, by the apparatus a network slice simultaneous registration group using the information associated with network slice selection; and providing, by the apparatus to a network entity, a requested network slice selection assistance information based on the selected network slice simultaneous registration group, wherein the information associated with network slice selection comprises at least one of:

a priority value for a network slice simultaneous registration group;

a priority value for an application;

a priority value associated with a traffic descriptor; or a priority value for single-network slice selection assistance information, and wherein the selecting comprises:

determining an average priority value of the single-network slice selection assistance information in each network slice simultaneous registration group, that has been normalized using the number of single-network slice selection assistance information in each network slice simultaneous registration group; and selecting the network slice simultaneous registration group with the highest average priority value.

15. The method according to claim 14, wherein the information associated with network slice selection comprises a priority value for a network slice access stratum group.

16. The method according to claim 15, wherein the information associated with network slice selection comprises an indication to use the priority value of the network slice access stratum group when selecting the network slice simultaneous registration group.

17. The method according to claim 14, wherein the information associated with network slice selection comprises at least one of:

a priority value for a network slice simultaneous registration group;

a priority value for an application;

a priority value associated with a traffic descriptor; or a priority value for single-network slice selection assistance information.

* * * * *